J. C. Boyer,
Stump Elevator.
Nº 78,920. Patented June 16, 1868.
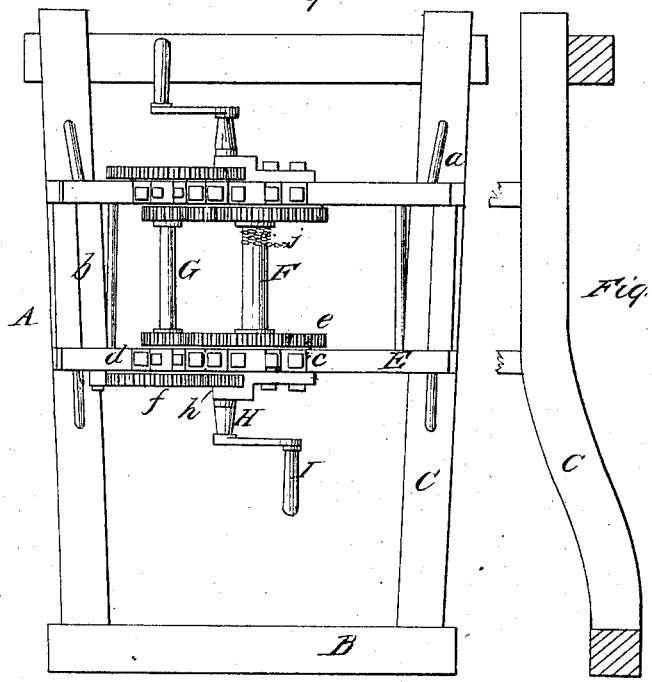
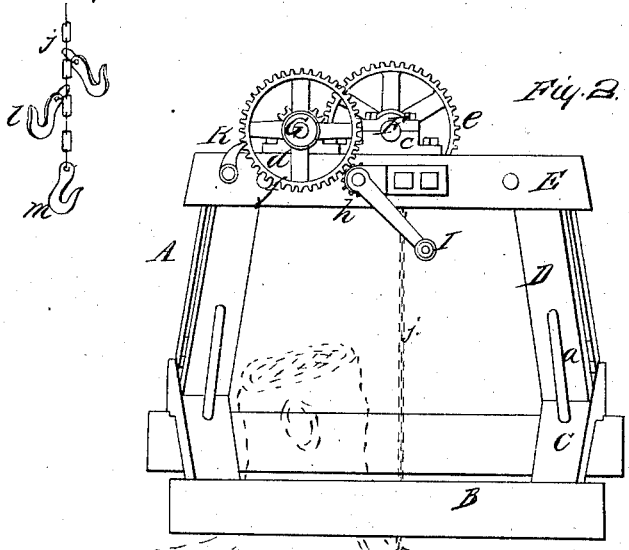
Witnesses:
P. T. Dodge
L. Hauler
Inventor:
J. C. Boyer
by Dodge & Munn
his attys

United States Patent Office.

JOHN G. BOYER, OF SPRINGFIELD, ASSIGNOR TO MOSES WIANT AND GEORGE GORR, OF LEHIGH COUNTY, PENNSYLVANIA.

Letters Patent No. 78,920, dated June 16, 1868; antedated March 27, 1868.

IMPROVED STUMP-EXTRACTOR.

The Schedule referred to in these Letters Patent and making part of the same.

TO ALL WHOM IT MAY CONCERN:

Be it known that I, JOHN G. BOYER, of Springfield, in the county of Bucks, and State of Pennsylvania, have invented certain new and useful Improvements in Portable Powers for farm use; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to portable powers for farm use, and consists in a novel construction and arrangement of mechanism for extracting or pulling up stumps, raising heavy stones, and for other and similar purposes upon a farm.

In the drawings—

Figure 1 is a top plan view,

Figure 2 is an end view, and

Figures 3 and 4 are views of parts detached.

In constructing my portable power, I make a strong frame, A, of timber, of any size desired, by taking two cross-pieces, B, and connecting them with the longitudinal pieces C. To the pieces C, I frame four uprights, D, and connect their upper ends with the cross-pieces E. This frame I strengthen with suitable braces, $a$ $b$, so as to make it firm and strong, as shown in figs. 1 and 2.

To the upper side of the cross-pieces E, I attach journal-boxes or bearings, $c$ and $d$, equally distant from each other, on each of the cross-pieces E. In the journal-boxes $c$, which are placed in or near the centre of the cross-pieces E, I mount a strong windlass, F, and firmly key to it two spur-wheels, $e$, one near each end of its bearings, as shown in fig. 1.

In the boxes or bearings $d$, I mount a shaft, G, made long enough to extend sufficiently far beyond the cross-pieces E to have keyed to its projecting ends two spur-wheels, $f$. On this shaft G, I key two pinions, $g$, just within the cross-pieces C, and so arranged as to gear into the spur-wheels $e$, as shown in fig. 1.

The spur-wheels $f$, I arrange to gear into pinions $h$, which are firmly attached to crank-shafts H, which have their bearings in the cross-pieces E and arms $i$, which latter are attached to the cross-pieces E, as clearly shown in figs. 1 and 2. To the crank-shafts H, I attach the cranks I.

By this arrangement, it will be seen that, as the cranks I are turned, they communicate motion to the spur-wheels $f$ through the pinions $h$, and that the spur-wheels $f$, in turn, communicate motion to the spur-wheels $e$ through the pinions $g$, and that the spur-wheels $e$ turn the windlass F, as clearly shown in fig. 1.

To the windlass F, I attach a chain or rope, $j$, and provide it with two movable hooks, $l$, and with one, $m$, attached to its extreme end, as clearly shown in fig. 3, for the purpose of conveniently hitching on to the object to be moved. The front ends of the pieces C, I curve, as shown in fig. 4, so that, when my power is mounted on a wagon, they will not interfere with the wheels.

On the sides of the cross-pieces E, I place pawls $k$, to catch into and hold the spur-wheels $f$ when desired, as shown in fig. 2.

In operating my portable power, I take it to the place where it is to be used; then attach the chain to the object to be elevated; turn the cranks I, which, through the pinions and spur-wheels above described, will cause the windlass F to revolve, and the object to which the chain is attached to move. When the object, whether a stump or stone, is raised, in this way, from its bed, it may be removed when desired.

In this way, I am able to construct and furnish a cheap and convenient portable power for farm use, as described.

Having thus described my invention, what I claim, is—

The portable power, consisting of the mechanism arranged substantially as described, and provided with the chain $j$, having movable hooks $l$ and the stationary hook $m$, all mounted on the frame A, constructed as set forth.

JOHN G. BOYER.

Witnesses:
A. F. WILLMEN,
NATHAN MILLER.